United States Patent
Tanaka et al.

(10) Patent No.: US 7,346,403 B2
(45) Date of Patent: Mar. 18, 2008

(54) PID PARAMETER ADJUSTMENT DEVICE

(75) Inventors: Masato Tanaka, Tokyo (JP); Seiji Kato, Tokyo (JP)

(73) Assignee: Yamatake Corporation, Tokyo (JP)

( * ) Notice: Subject to any disclaimer, the term of this patent is extended or adjusted under 35 U.S.C. 154(b) by 218 days.

(21) Appl. No.: 10/569,035

(22) PCT Filed: Aug. 2, 2004

(86) PCT No.: PCT/JP2004/011052

§ 371 (c)(1),
(2), (4) Date: Feb. 16, 2006

(87) PCT Pub. No.: WO2005/019949

PCT Pub. Date: Mar. 3, 2005

(65) Prior Publication Data

US 2006/0224255 A1 Oct. 5, 2006

(30) Foreign Application Priority Data

Aug. 21, 2003 (JP) ............................. 2003-297252

(51) Int. Cl.
*G05B 13/02* (2006.01)
(52) U.S. Cl. ............................. 700/52; 700/28; 700/29; 700/30; 700/31; 700/42; 700/43; 700/44; 700/45; 700/46
(58) Field of Classification Search ............ 700/28–31, 700/42–46, 52
See application file for complete search history.

(56) References Cited

U.S. PATENT DOCUMENTS 4,755,294 A * 7/1988 Pradet et al. ............ 210/198.2
4,992,927 A * 2/1991 Araki ........................... 700/40
5,182,703 A * 1/1993 Yamamoto ................... 700/54
5,245,528 A * 9/1993 Saito et al. ................... 700/41
5,347,446 A * 9/1994 Iino et al. ..................... 700/29
5,394,322 A * 2/1995 Hansen ......................... 700/37
5,396,415 A * 3/1995 Konar et al. .................. 700/42
5,410,470 A * 4/1995 Yamaoka et al. ............. 700/45
5,461,559 A * 10/1995 Heyob et al. ................. 700/29
5,537,310 A * 7/1996 Tanake et al. ................ 700/31
5,568,377 A * 10/1996 Seem et al. ................... 700/37
5,609,136 A * 3/1997 Tuken ......................... 123/357
5,625,551 A * 4/1997 Mitarai et al. ................ 700/29

(Continued)

FOREIGN PATENT DOCUMENTS

| JP | 04-256102 A | 9/1992 |
| JP | 08-022307 A | 1/1996 |
| JP | 2000-155603 A | 6/2000 |
| JP | 2002-351502 A | 6/2002 |

*Primary Examiner*—Ronald Hartman, Jr.
(74) *Attorney, Agent, or Firm*—Blakely Sokoloff Taylor & Zafman

(57) ABSTRACT

A PID parameter adjustment device includes: a model storage section (1) for storing an equation model to be controlled; a PID controller storage section (2) for storing a control algorithm; a constraint condition storage section (3) for storing a constraint condition for the operation; a simulation operation section (5) for executing simulation of a control system according to the constraint condition; an ideal control result storage section (6) for storing an ideal control response characteristic; an evaluation function operation section (7) for calculating the evaluation function value indicating the closeness between the simulation result and the ideal control response characteristic; and a PID parameter search operation section (8) for executing simulation while modifying the PID parameter and searching a PID parameter at which the evaluation function value is optimal.

4 Claims, 9 Drawing Sheets

U.S. PATENT DOCUMENTS

| | | | |
|---|---|---|---|
| 5,847,952 A * | 12/1998 | Samad | 700/48 |
| 6,081,751 A * | 6/2000 | Luo et al. | 700/42 |
| 6,128,541 A * | 10/2000 | Junk | 700/39 |
| 6,207,936 B1 * | 3/2001 | de Waard et al. | 219/497 |
| 6,510,353 B1 * | 1/2003 | Gudaz et al. | 700/37 |
| 6,577,908 B1 * | 6/2003 | Wojsznis et al. | 700/42 |
| 6,917,840 B2 * | 7/2005 | Lund | 700/33 |
| 7,035,695 B2 * | 4/2006 | Boiko | 700/28 |
| 7,113,834 B2 * | 9/2006 | Wojsznis et al. | 700/33 |
| 7,181,295 B2 * | 2/2007 | Yu et al. | 700/42 |
| 2003/0153990 A1 * | 8/2003 | Boiko | 700/37 |
| 2003/0195641 A1 * | 10/2003 | Wojsznis et al. | 700/42 |

* cited by examiner

US 7,346,403 B2

PID PARAMETER ADJUSTMENT DEVICE

TECHNICAL FIELD

The present invention relates to a process control technique and, more particularly, to a parameter adjustment device which adjusts control parameters for a controller.

BACKGROUND ART

As a simple method of adjusting PID parameters for a PID controller, an auto-tuning method based on limit cycles has been proposed (see, for example, patent reference 1). Such a simple method is executed on the assumption that when a controlled system is expressed as a transfer function, the degree or the like of the function takes a specific value. In this method, PID parameters are roughly adjusted.

In order to make finer adjustment than the above simple method, a method of determining PID parameters by analyzing process parameters (a process gain, a process time constant, and the like) including the degree of a controlled system has also been proposed (see, for example, patent reference 2). According to this technique, for example, a modeling step of approximating a characteristic of a controlled system to a transfer function expression, and PID parameters are determined by referring to the modeling results. In this case, traditional adjustment formulas such as the CHR (Chien, Hrones, Reswick) method and IMC (Internal Model Control) method are used.

Note that the present applicant has not found any prior art references associated with the present invention other than the prior art references specified by the prior art reference information described in this specification:

patent reference 1: Japanese Patent Laid-Open No. 2000-155603 patent reference 2: Japanese Patent Laid-Open No. 2002-351502

DISCLOSURE OF INVENTION

Problems to be Solved by the Invention

In the conventional PID parameter adjustment method based on modeling results, if, for example, a controlled system is a second-order lag system, there are two time constants. However, the ratio of these time constants is, for example, 2:1 or 3:1; this ratio is not uniform. That is, modeling results vary. In some cases, therefore, almost optimal adjustment results are obtained by adjustment formulas such as those in the CHR method and IMC method. In other cases, however, adjustment results far from optimal are obtained.

In an actual control site, limit processing based on upper and lower limit values is performed for the manipulated variable output from a controller. That is, in a transition state wherein a controlled variable is changed with a change in a set point as an input to the controller, limit processing based on upper and lower limit values occurs. Since the above adjustment formulas organized mainly on a theoretical basis are not premised on the practical constraint operation of the controller such as this limit processing, PID parameter adjustment results become far from optimal in some cases.

The present invention has been made to solve the above problems, and has as its object to provide a parameter adjustment device which can cope with the diversity of modeling results and the practical constraint operation of a controller in adjusting control parameters based on modeling results.

Means of Solution to the Problem

According to the present invention, there is provided a parameter adjustment device which adjusts a control parameter for a controller which calculates a manipulated variable by performing computation based on the control parameter, comprising a model storage unit which stores a mathematical model of a controlled system in advance, a controller storage unit which stores, in advance, a controller algorithm by which the controller controls the controlled system, a constraint condition storage unit which stores a constraint condition on operation of the controller in advance, a simulation computation unit which performs a simulation on the basis of the constraint condition to simulate a control response of a control system including the controlled system represented by the mathematical model and a controller represented by the controller algorithm, an ideal control result storage unit which stores an ideal control response characteristic of the control system in advance, an evaluation function computation unit which computes an evaluation function value representing a proximity between a result of the simulation and the ideal control response characteristic, and a parameter search computation unit which causes the simulation computation unit to execute the simulation while sequentially changing the control parameter for the controller algorithm, and uses, as a parameter adjustment result, a control parameter which makes the evaluation function value become an optimal value.

In addition, according to the present invention, there is provided a parameter adjustment device comprising a model storage unit which stores a mathematical model of a controlled system in advance, a controller storage unit which stores, in advance, a controller algorithm by which the controller controls the controlled system, a constraint condition storage unit which stores a constraint condition on operation of the controller in advance, an ideal control result storage unit which stores an ideal control response characteristic associated with a control system including a controlled system represented by the mathematical model and a controller represented by the controller algorithm, a first simulation computation unit which performs a first simulation to simulate a transition state of the controlled system by applying an upper limit manipulated variable or a lower limit manipulated variable defined by the constraint condition to the controlled system for a manipulated variable maintenance time, an ideal response result storage unit which stores an ideal response result as an ideal result of the first simulation in advance, a first evaluation function computation unit which computes a first evaluation function value representing a proximity between a result of the first simulation and the ideal response result, a manipulated variable maintenance time search computation unit which extracts a manipulated variable maintenance time which makes the first evaluation function value become an optimal value by causing the first simulation computation unit to execute the first simulation while sequentially changing the manipulated variable maintenance time, an ideal response waveform registration processing unit which registers a result of the first simulation corresponding to the extracted manipulated variable maintenance time as the ideal control response characteristic in the ideal control result storage unit, a second simulation computation unit which performs a second simulation to simulate a control response of the control system on the basis of the constraint condition, a second evaluation function computation unit which computes a second evaluation function value representing a proximity between a result of the second simulation and the ideal control response characteristic registered in the ideal control result storage unit, and a parameter search computation unit which causes the second simulation computation unit to execute the second simulation while sequentially changing the control parameter for the controller algorithm, and uses, as a parameter adjustment result, a control parameter which makes the second evaluation function value become an optimal value.

An example of the arrangement of the parameter adjustment device of the present invention comprises an auto-tuning computation unit which executes auto-tuning simulation processing of calculating an estimated value of the control parameter from a response of the controlled system by applying a manipulated variable with a predetermined amplitude to the controlled system, and a parameter search range setting unit which determines a search range of the control parameter on the basis of the estimated value of the control parameter and sets the search range in the parameter search computation unit.

Effects of the Invention

According to the present invention, a control system is created on the adjustment device by combining a controller algorithm and a modeling result (mathematical model) of a controlled system, the difference between a simulation result on the controlled system and an ideal control response characteristic is provided as an evaluation function value, and the control system is repeatedly simulated so as to make an evaluation function value approach an optimal value, thereby searching for optimal control parameters. This makes it possible to accurately reflect the modeling result on the controlled system in control parameter adjustment and cope with the diversity of modeling results. In addition, since simulations are performed on the basis of constraint conditions on the operation of the controller, the practical constraint operation of the controller can be accurately reflected in control parameter adjustment, thereby coping with the practical constraint operation.

In addition, the first simulation is performed to simulate the transition state of a controlled system by applying the upper limit manipulated variable or lower limit manipulated variable defined by constraint conditions to the controlled system for the manipulated variable maintenance time, and the difference between the first simulation result and the ideal response result is provided as the first evaluation function value. An ideal control response characteristic is obtained by repeating the first simulation so as to make the first evaluation function value approach an optimal value. This ideal control response characteristic is then registered in the ideal control result storage unit, thus searching for the above control parameters. This makes it possible to realize optimal control parameter adjustment without requiring the user to have expertise about control.

Furthermore, the limit cycle auto-tuning method of generating limit cycles with a predetermined manipulated variable width and adjusting control parameters is executed by a simulation to calculate estimated values of control parameters. Search ranges are narrowed down on the basis of the calculated estimated values of the control parameters, and then a search for control parameters is performed. This makes it possible to shorten the time required to search for optimal control parameters.

BEST MODE FOR CARRYING OUT THE INVENTION

First Embodiment

Figure 1:
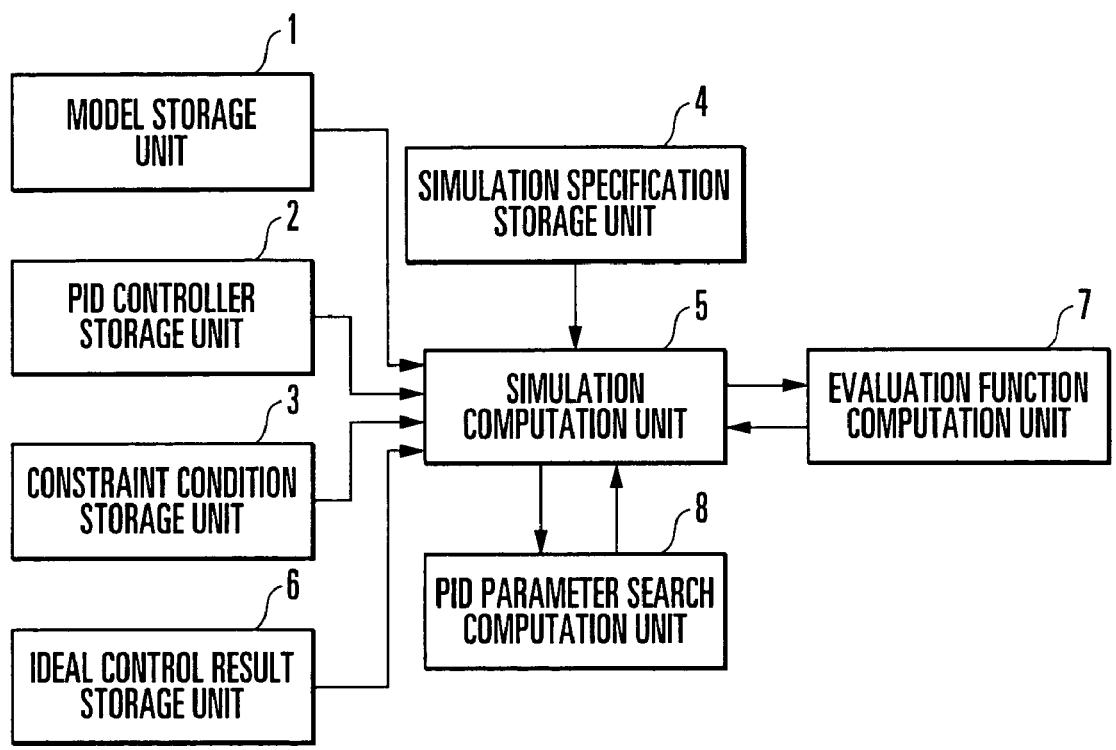
FIG. 1 is a block diagram showing the arrangement of a PID parameter adjustment device according to the first embodiment of the present invention.
Figure 2:
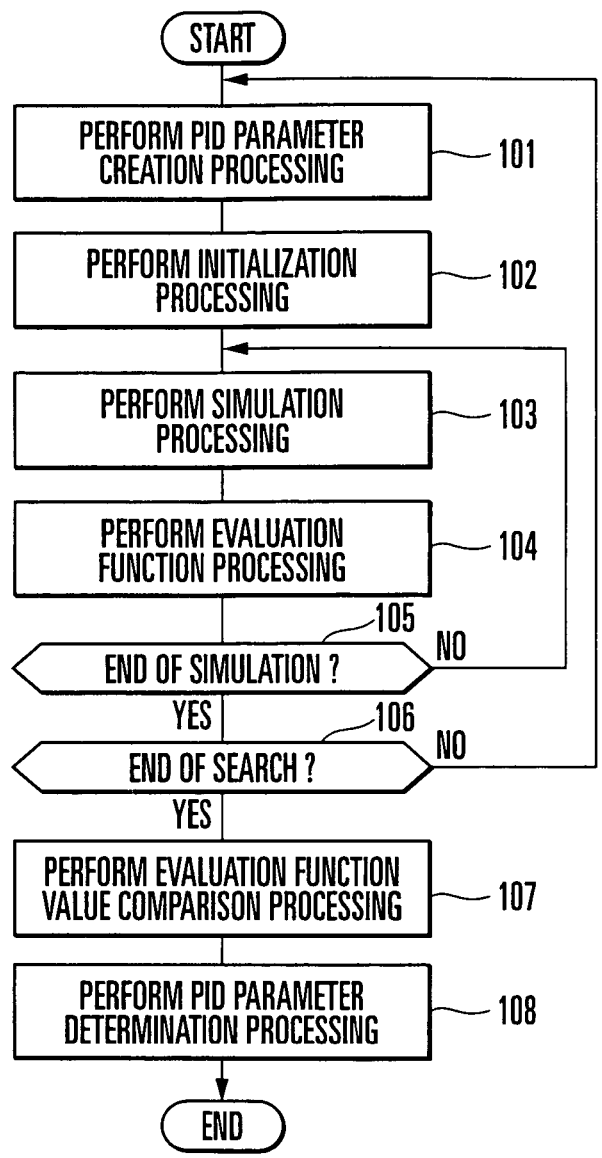
FIG. 2 is a flowchart showing the operation of the PID parameter adjustment device in FIG. 1.

An embodiment of the present invention will be described in detail below with reference to the accompanying drawings. FIG. 1 is a block diagram showing the arrangement of a PID parameter adjustment device according to the first embodiment of the present invention. FIG. 2 is a flowchart showing the operation of the PID parameter adjustment device in FIG. 1.

The PID parameter adjustment device of this embodiment comprises a model storage unit 1 which stores a mathematical model of a controlled system in advance, a PID controller storage unit 2 which stores a PID controller algorithm in advance, a constraint condition storage unit 3 which stores constraint conditions on the operation of the controller in advance, a simulation specification storage unit 4 which stores, in advance, the specifications of a simulation of the control response of a control system comprising the controlled system represented by the mathematical model and the controller represented by the controller algorithm, a simulation computation unit 5 which executes a simulation to simulate the control system on the basis of the constraint conditions on the operation of the controller, an ideal control result storage unit 6 which stores the ideal control response characteristic of the control system in advance, an evaluation function computation unit 7 which computes an evaluation function value representing the proximity between a simulation result and the ideal control response characteristic, and a PID parameter search computation unit 8 which causes the simulation computation unit 5 to execute simulations while sequentially changing the control parameters (PID parameters in this embodiment) of the controller algorithm, and uses, as a parameter adjustment result, a PID parameter by which an optimal evaluation function value is obtained.

The operation of the PID parameter adjustment device according to this embodiment will be described below. The operation of each constituent element will be described first, and the flow of overall processing will be described next with reference to FIG. 2.

Assuming that a controlled system has time lag and dead time factors, a transfer function Gp can be expressed as follows:

$$Gp = Kp \exp(-Lps)/\{(1+T1s)(1+T2s)(1+T3s)\} \quad (1)$$

where Kp is a process gain, Lp is a process dead time, T1, T2, and T3 are process time constants, and s is a Laplace operator.

The mathematical model represented by equation (1) is registered in advance in the model storage unit 1 by the user of the PID parameter adjustment device. In addition, the process gain Kp, process dead time Lp, and process time constants T1, T2, and T3 which are obtained in advance by a known modeling technique are registered in the model storage unit 1 in advance. According to equation (1), a controlled system with up to a third-order lag can be expressed.

The user registers, in the PID controller storage unit 2 in advance, a PID controller algorithm represented by a transfer function like that given by the following equation, i.e., a program for making the simulation computation unit 5 implement a PID controller:

$$MV = (100/Pb)\{1+(1/Tis)+Tds\}(SP-PV) \quad (2)$$

where Pb is a proportional band, Ti is an integral time, Td is a derivative time, MV is a manipulated variable, SP is a set point, and PV is a controlled variable. The proportional band Pb, integral time Ti, and derivative time Td are determined by the PID parameter search computation unit 8. In addition, the manipulated variable MV, set point SP, and controlled variable PV dynamically change as a simulation is executed by the simulation computation unit 5.

The user registers the following constraint conditional expressions in the constraint condition storage unit 3 in advance:

$$\text{if } MV > MVH \text{ then } MV = MVH \quad (3)$$

$$\text{if } MV < MVL \text{ then } MV = MVL \quad (4)$$

where MVH is the upper limit value of the manipulated variable MV output to the controlled system, and MVL is the lower limit value of the manipulated variable MV. Expression (3) indicates a case wherein if the manipulated variable MV computed by the simulation computation unit 5 is larger than the manipulated variable upper limit value MVH, upper limit processing is performed to set MV=MVH, i.e., to set the manipulated variable upper limit value MVH to the manipulated variable MV. Expression (4) indicates a case wherein if the computed manipulated variable MV is smaller than the manipulated variable lower limit value MVL, lower limit processing is performed to set MV=MVL, i.e., to set the manipulated variable lower limit value MVL to the manipulated variable MV.

The user registers the simulation specifications represented by the following expressions in the simulation specification storage unit 4 in advance:

$$\text{if } T < T\text{step then } SP = SP1 \text{ else } SP = SP2 \quad (5)$$

$$\text{if } T = T\text{sim then [terminate simulation]} \quad (6)$$

where SP1 is a set point before a step response, SP2 is a set point after the step response, T is the elapsed time of a simulation, Tstep is the time from the start time (T=0) of the simulation to the time of a step change in the set point SP, and Tsim is the total simulation time.

Expression (5) indicates that the set point SP is set to SP1 before the elapsed T from the simulation start time reaches Tstep, and the set point SP is set to SP2 when the elapsed time T reaches Tstep. Expression (6) indicates that when the elapsed time T reaches Tsim, the simulation is terminated.

Figure 3:
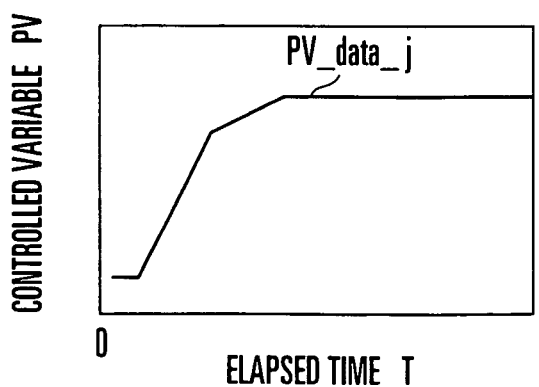
FIG. 3 is a timing chart schematically showing an ideal control response characteristic in the first embodiment of the present invention.

A control response characteristic ideal for the user, i.e., an ideal controlled variable PV_data_j in elapsed time T=Tj (Tj≦Tsim where j is an integer from 1 to n), is registered in the ideal control result storage unit 6 in advance. In order to determine an ideal control response characteristic, at least one specific value of the controlled variable PV_data_j (n≧1) is required. FIG. 3 schematically shows the ideal control response characteristic.

Figure 4:
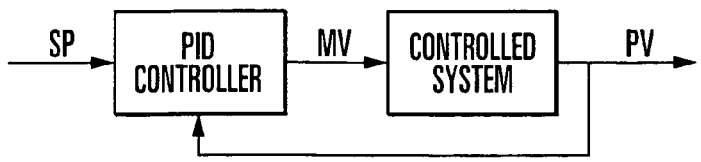
FIG. 4 is a block diagram of a control system in the first embodiment of the present invention.

The simulation computation unit 5 performs a simulation to simulate the control response of a virtual control system comprising the controlled system represented by the mathematical model in the model storage unit 1 and the PID controller represented by the controller algorithm in the PID controller storage unit 2 on the basis of the constraint conditional expressions in the constraint condition storage unit 3 and the simulation specifications in the simulation specification storage unit 4. FIG. 4 is a block diagram showing the control system in this case.

The simulation computation unit 5 executes initialization processing and simulation processing. In the initialization processing, the simulation computation unit 5 sets the initial value of the controlled variable PV at the simulation start time to SP1, the initial value of the set point SP to SP1, the initial value of the manipulated variable MV to SP1/Kp, and the elapsed time T of a simulation to 0. The simulation processing will be described later.

The evaluation function computation unit 7 executes evaluation function processing of obtaining an evaluation function value F representing the proximity between a simulation result and the ideal control response characteristic as follows.

$$F = \sum_{j=1}^{n} (PV\_Tj - PV\_data\_j)^2 \quad (7)$$

where PV_Tj is the controlled variable computed by simulation processing at elapsed time T=Tj, and n is the data count of the ideal controlled variable PV_data_j, as described above. When the calculation result of equation (7) becomes 0 or a minimum value (positive value) near 0, the evaluation function value F is an optimal value. In this case, the simulation result becomes closest to the ideal control response characteristic.

The PID parameter search computation unit 8 executes PID parameter search processing comprising PID parameter creation processing, evaluation function value comparison processing, and PID parameter determination processing.

In the PID parameter creation processing, the PID parameter search computation unit 8 sequentially creates, one by one, all values which PID parameters can take, i.e., all combinations of the proportional bands Pb, integral times Ti, and derivative times Td. Letting Pb_max be the proportional band search upper limit value determined in advance, Ti_max be the integral time search upper limit value determined in advance, and Td_max be the derivative time search upper limit value determined in advance, the proportional band Pb is created within the range of 0<Pb<Pb_max with a resolution of dPb, the integral time Ti is created within the range of 0<Ti<Ti_max with a resolution of dTi, and the derivative time Td is created within the range of 0<Td<Td_max with a resolution of dTd.

In the evaluation function value comparison processing, the PID parameter search computation unit 8 compares evaluation function values F calculated with respect to all the combinations of the proportional bands Pb, integral times Ti, and derivative times Td with each other, and extracts a combination of the proportional band Pb, integral time Ti, and derivative time Td which provides a minimum evaluation function value F_min (F_min$\geq$0) of all the evaluation function values F.

In the PID parameter determination processing, the PID parameter search computation unit 8 uses, as a parameter adjustment result, the combination of the proportional band Pb, integral time Ti, and derivative time Td which is extracted by the evaluation function value comparison processing.

Note that the above PID parameter search processing is a technique of causing the simulation computation unit 5, which creates, one by one, all the values which PID parameters can take, to execute simulation processing and comparing all the calculated evaluation function values F with each other to search for the optimal PID parameters. This technique is, however, a technique based on no consideration of search efficiency, and is only an example. A generally known simplex method or the like may be used as an efficient method of making the simulation computation unit 5 perform searching operation while sequentially changing PID parameters so as to make the evaluation function value F approach an optimal value.

The flow of processing in the PID parameter adjustment device in FIG. 1 will be described next with reference to FIG. 2. The PID parameter adjustment device starts the processing in FIG. 2 in accordance with, for example, a request from the user. First of all, the PID parameter search computation unit 8 performs PID parameter creation processing (step 101 in FIG. 2). The simulation computation unit 5 performs initialization processing (step 102).

Subsequently, the simulation computation unit 5 performs simulation processing at elapsed time T=0 (step 103). In this simulation processing at elapsed time T=0, the simulation computation unit 5 performs upper limit processing or lower limit processing for the manipulated variable MV determined in the initialization processing on the basis of the above constraint conditional expressions as needed. The simulation computation unit 5 then computes the controlled variable PV according to the following equation based on the mathematical model in the model storage unit 1 and stores the controlled variable PV as a simulation result in correspondence with elapsed time T=0.

$$PV = [Kp \exp(-Lps)/\{(1+T1s)(1+T2s)(1+T3s)\}]MV \quad (8)$$

In general, after the execution of the simulation processing, the evaluation function computation unit 7 executes evaluation function processing. However, since no ideal control response characteristic is determined at elapsed time T=0, evaluation function processing is not executed.

After the execution of the simulation processing, the simulation computation unit 5 determines whether T$\geq$Tsim holds (step 105). If T$\geq$Tsim, i.e., the elapsed time T has reached Tsim, it is determined in accordance with the above simulation specifications that the simulation processing is complete, and the flow advances to step 106. If the elapsed time T has not reached Tsim, it is determined that the simulation processing is not complete, and the flow returns to step 103.

The simulation computation unit 5 then performs simulation processing at elapsed time T>0 (step 103). In this simulation processing at elapsed time T>0, the simulation computation unit 5 determines whether T$\geq$Tstep holds. If the elapsed time T has not reached Tstep, the simulation computation unit 5 keeps setting the set point SP to SP1. If the elapsed time T has reached Tstep, the simulation computation unit 5 changes the set point SP to SP2. Subsequently, the simulation computation unit 5 computes the manipulated variable MV by using the controlled variable PV computed in the immediately preceding simulation processing, the current set point SP, and the PID parameters created in step 101 according to the PID controller algorithm represented by equation (2). After performing upper limit processing or lower limit processing, as needed, based on the above constraint conditional expressions for the computed manipulated variable MV, the simulation computation unit 5 computes the controlled variable PV according to equation (8), and stores the controlled variable PV as a simulation result in correspondence with the elapsed time T.

If elapsed time T>0 is an elapsed time Tj during which the ideal controlled variable PV_data_j is registered in the ideal control result storage unit 6 (T=Tj), since the controlled variable computed by the simulation computation unit 5 is PV_Tj, the evaluation function computation unit 7 calculates the evaluation function value F from the controlled variable PV_Tj and the controlled variable PV_data_j according to equation (7) (step 104).

The simulation computation unit 5 and the evaluation function computation unit 7 repeatedly execute the above simulation processing and evaluation function processing at elapsed time T>0 in predetermined cycles until T$\geq$Tsim holds in step 105.

At some midway point at which elapsed time T$\geq$Tn does not hold, since there are still some ideal controlled variables which have not been compared with the simulation result, the evaluation function processing at this midway point is processing of calculating evaluation function values F as interim values like $(PV\_T1-PV\_data\_1)^2 + (PV\_T2-PV\_data\_2)^2 + (PV\_T3-PV\_data\_3)^2 \ldots$.

If it is determined in step 105 that T$\geq$Tsim holds, the simulation computation unit 5 determines that the simulation processing is complete, and determines whether the processing in steps 101 to 105 is complete for all the combinations of the PID parameters (step 106). If the processing in steps 101 to 105 for all the combinations of the PID parameters is complete, the flow advances to step 107. If the processing is not complete, the flow returns to step 101 to cause the PID parameter search computation unit 8 to create a new combination of the proportional band Pb, integral time Ti, and derivative time Td. In this manner, the processing in steps 101 to 105 is executed for each of all the combinations of the proportional bands Pb, integral times Ti, and derivative times Td.

If the processing in steps 101 to 105 for all the combinations of the PID parameters is complete, the PID parameter search computation unit 8 executes evaluation function value comparison processing, and extracts a combination of the proportional band Pb, integral time Ti, and derivative time Td which provides the minimum evaluation function value F_min (step 107). The PID parameter search computation unit 8 then uses the extracted combination of the proportional band Pb, integral time Ti, and derivative time Td as a parameter adjustment result (step 108).

With the above operation, the processing by the PID parameter adjustment device is terminated.

According to this embodiment, a virtual control system is created on the adjustment device by combining a PID controller algorithm and a modeling result (mathematical model) of a controlled system, the difference between a simulation result on the control system and an ideal control response characteristic is provided as an evaluation function value, and the control system is repeatedly simulated so as to make an evaluation function value approach an optimal value, thereby searching for optimal PID parameters. This makes it possible to accurately reflect the modeling result on the controlled system in PID parameter adjustment and cope with the diversity of modeling results. In addition, since simulations are performed on the basis of constraint conditions on the operation of the controller, the practical constraint operation of the controller can be accurately reflected in PID parameter adjustment, thereby coping with the practical constraint operation.

Second Embodiment

Figure 5:
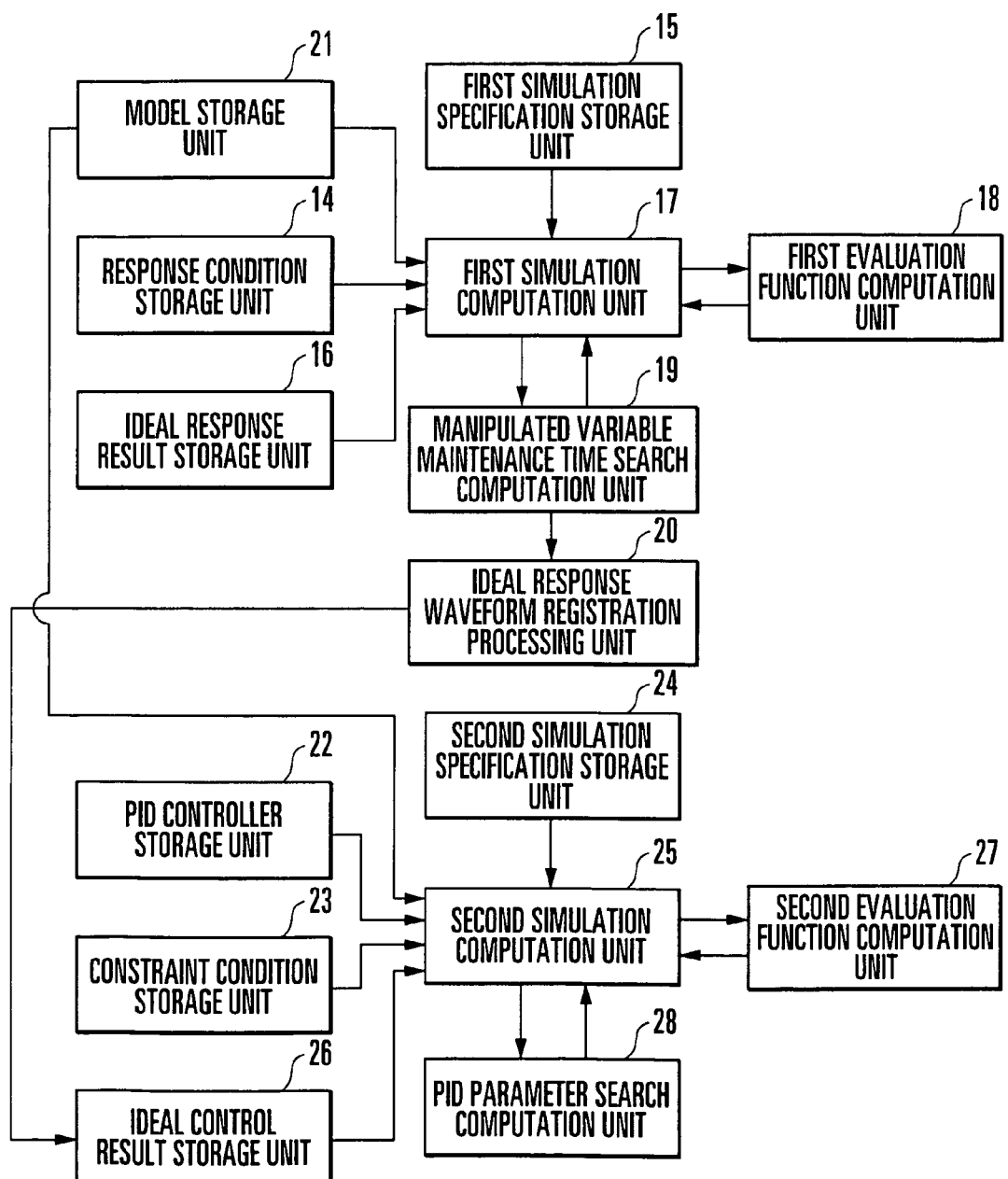
FIG. 5 is a block diagram showing the arrangement of a PID parameter adjustment device according to the second embodiment of the present invention.
Figure 6:
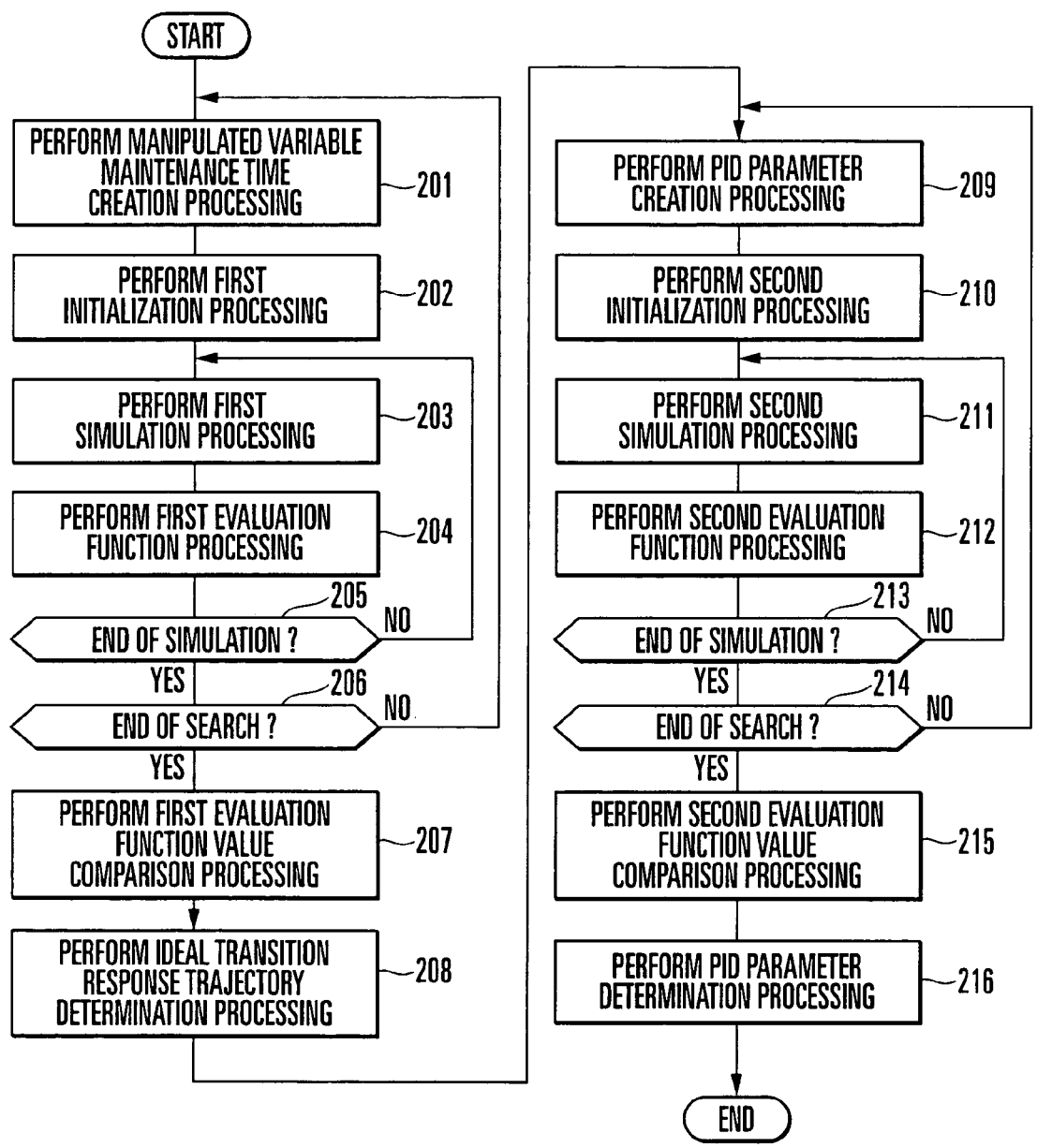
FIG. 6 is a flowchart showing the operation of the PID parameter adjustment device in FIG. 5.

The second embodiment of the present invention will be described next. FIG. 5 is a block diagram showing the arrangement of a PID parameter adjustment device according to the second embodiment of the present invention. FIG. 6 is a flowchart showing the operation of the PID parameter adjustment device in FIG. 5.

The PID parameter adjustment device of this embodiment comprises a response condition storage unit 14 which stores response condition variables for the first simulation of a transition state of a controlled system in advance, a first simulation specification storage unit 15 which stores the specifications of the first simulation, an ideal response result storage unit 16 which stores an ideal response result as the ideal result of the first simulation in advance, a first simulation computation unit 17 which performs the first simulation by providing an upper limit manipulated variable or a lower limit manipulated variable to the controlled system for a manipulated variable maintenance time, a first evaluation function computation unit 18 which computes the first evaluation function value representing the proximity between the first simulation result and the ideal response result, a manipulated variable maintenance time search computation unit 19 which extracts a manipulated variable maintenance time as the optimal value of the first evaluation function value by causing the first simulation computation unit 17 to execute the first simulation while sequentially changing the manipulated variable maintenance time, an ideal response waveform registration processing unit 20 which registers the first simulation result corresponding to the extracted manipulated variable maintenance time as an ideal control response characteristic in an ideal control result storage unit 26, a model storage unit 21, a PID controller storage unit 22, a constraint condition storage unit 23, a second simulation specification storage unit 24, a second simulation computation unit 25, the ideal control result storage unit 26, a second evaluation function computation unit 27, and a PID parameter search computation unit 28.

Since the operations of the model storage unit 21, PID controller storage unit 22, constraint condition storage unit 23, second simulation specification storage unit 24, second simulation computation unit 25, second evaluation function computation unit 27, and PID parameter search computation unit 28 are the same as those of the model storage unit 1, PID controller storage unit 2, constraint condition storage unit 3, simulation specification storage unit 4, simulation computation unit 5, evaluation function computation unit 7, and PID parameter search computation unit 8 in the first embodiment, a description thereof will be omitted.

Although the operation of the ideal control result storage unit 26 is the same as that of the ideal control result storage unit 6 in the first embodiment, the ideal control response characteristic stored in the ideal control result storage unit 26 is registered not by the user but by the ideal response waveform registration processing unit 20, as will be described later.

Manipulated variables to be provided to the controlled system during the first simulation are registered as response condition variables in the response condition storage unit 14 in advance. Note that since these response condition variables are the same as a manipulated variable upper limit value MVH and a manipulated variable lower limit value MVL written in constraint conditional expressions (3) and (4) in the first embodiment, response condition variables may be acquired from the constraint conditions without using the response condition storage unit 14.

The specifications of the first simulation are registered in the first simulation specification storage unit 15 in advance by the user. The specifications of the first simulation are the same as those of the simulation processing described with reference to expressions (5) and (6) in the first embodiment.

An overshoot amount OS is registered in advance as an ideal response result which is an ideal result of the first simulation in the ideal response result storage unit 16 by the user.

The first simulation computation unit 17 executes the first initialization processing and the first simulation processing on the basis of the response condition variables in the response condition storage unit 14 and the simulation specifications in the simulation specification storage unit 16.

In the first initialization processing, the simulation computation unit 17 sets the initial value of a controlled variable PV at the simulation start time to SP1, the initial value of a set point SP to SP1, the initial value of a manipulated variable MV to SP1/Kp, and an elapsed time T of the simulation to 0.

In the first simulation processing, the simulation computation unit 17 performs the following processing while performing the processing represented by expression (5) on the basis of the simulation specifications in the simulation specification storage unit 16:

$$\text{if } T < Tstep \text{ then } MV = SP1/Kp \tag{9}$$

$$\text{if } Tstep \leq T \leq Tstep + dTmv \text{ then } MV = MV\_dTmv \tag{10}$$

$$\text{if } T > Tstep + dTmv \text{ then } MV = SP2/Kp \tag{11}$$

In expression (10), dTmv is a manipulated variable maintenance time as the time during which manipulated variable MV=MV_dTmv is maintained.

Expression (9) indicates that the manipulated variable MV is SP1/Kp at the time when the elapsed time T from the simulation start time has not reached Tstep.

Expression (10) indicates that the manipulated variable MV is set to MV_dTmv when the elapsed time T is equal to or more than Tstep and equal to or less than Tstep+dTmv. If Kp>0 and SP1<SP2 or Kp<0 and SP1>SP2, MV_dTmv=MVH is set by using the manipulated variable upper limit value MVH of a response condition variable stored in the response condition storage unit 14. If Kp>0 and SP1>SP2 or Kp<0 and SP1<SP2, MV_dTmv=MVL is set by using the manipulated variable lower limit value MVL of a response condition variable.

Expression (11) indicates that when the elapsed time T exceeds Tstep+dTmv, the manipulated variable MV is set to SP2/Kp.

The first evaluation function computation unit 18 executes the first evaluation function processing of obtaining a first evaluation function value G representing the proximity between the first simulation result and the ideal response result according to the following equation:

$$G=(OS\_sim-OS)^2 \quad (12)$$

where OS_sim is the amount of overshoot that occurs during the first simulation. When the calculation result by equation (12) is a minimum value (positive value) near 0, the first evaluation function value G is an optimal value. In this case, the first simulation result is nearest to the ideal response result. In the case of the evaluation function represented by equation (12), simulating a nearly accurate continuous system makes it possible to execute a simulation sufficiently close to G=0, i.e., OS_sim=OS.

The manipulated variable maintenance time search computation unit 19 executes manipulated variable maintenance time search processing comprising manipulated variable maintenance time creation processing and first evaluate function value comparison processing.

In the manipulated variable maintenance time creation processing, the manipulated variable maintenance time search computation unit 19 sequentially creates, one by one, all values which the manipulated variable maintenance time dTmv can take. Letting dTmv_max be a predetermined manipulated variable maintenance time search upper limit value, a range which the manipulated variable maintenance time dTmv can take is created within the range of 0<dTmv<dTmv_max with a precision corresponding to a resolution Dmv.

In the first evaluation function value comparison processing, the manipulated variable maintenance time search computation unit 19 compares evaluation function values G calculated with respect to all the values which the manipulated variable maintenance time dTmv can take, and extracts the manipulated variable maintenance time dTmv that provides a minimum evaluation function value G_min (G_min>0) of all the evaluation function values G.

Note that the above manipulated variable maintenance time search processing is a technique of creating, one by one, all the values which the manipulated variable maintenance time dTmv can take, causing the first simulation computation unit 17 to execute the first simulation processing, and comparing all the calculated evaluation function values G, thereby searching for an optimal manipulated variable maintenance time dTmv. This technique is, however, a technique based on no consideration of search efficiency, and is only an example.

The ideal response waveform registration processing unit 20 registers the first simulation results (the elapsed time T and the controlled variable PV) corresponding to the manipulated variable maintenance time dTmv extracted by the manipulated variable maintenance time search computation unit 19 as an ideal control response characteristic in the ideal control result storage unit 26.

After the ideal control response characteristic is registered in the ideal control result storage unit 26, the model storage unit 21, PID controller storage unit 22, constraint condition storage unit 23, second simulation specification storage unit 24, second simulation computation unit 25, second evaluation function computation unit 27, and PID parameter search computation unit 28 execute the processing described in the first embodiment.

The flow of processing in the PID parameter adjustment device in FIG. 5 will be described next with reference to FIG. 6. The PID parameter adjustment device starts the processing in FIG. 6 in accordance with, for example, a request from the user. First of all, the manipulated variable maintenance time search computation unit 19 performs manipulated variable maintenance time creation processing (step 201 in FIG. 6), and the first simulation computation unit 17 performs the first initialization processing (step 202).

Subsequently, the first simulation computation unit 17 performs the first simulation processing at elapsed time T=0 (step 203). In the first simulation processing at elapsed time T=0, the simulation computation unit 17 computes the controlled variable PV by substituting manipulated variable MV=SP1/Kp determined in the first initialization processing into equation (8), and stores the controlled variable PV as the first simulation result in correspondence with elapsed time T=0.

After the execution of the first simulation processing, the first evaluation function computation unit 18 executes first evaluation function processing. At a time point when no overshoot has occurred in the controlled variable PV, however, an evaluation function value G is calculated with overshoot amount OS_sim=0 (step 204).

After the execution of the first simulation processing, the first simulation computation unit 17 determines whether the elapsed time T has reached Tsim (step 205). If the elapsed time T has reached Tsim, it is determined in accordance with the simulation specifications in the first simulation specification storage unit 15 that the first simulation processing is complete, and the flow advances to step 206. If the elapsed time T has not reached Tsim, it is determined that the first simulation processing is not complete, and the flow returns to step 203.

The first simulation computation unit 17 performs the first simulation processing at elapsed time T>0 (step 203). In the first simulation processing at elapsed time T>0, the simulation computation unit 17 determines whether T≧Tstep holds. If the elapsed time T has not reached Tstep, the simulation computation unit 17 keeps setting the set point SP to SP1. If the elapsed time T has reached Tstep, the simulation computation unit 17 changes the set point SP to SP2. Subsequently, the simulation computation unit 17 determines the manipulated variable MV by using one of expressions (9), (10), and (11) in accordance with the elapsed time T, computes the controlled variable PV according to equation (8), and stores the controlled variable PV as the first simulation result in correspondence with the elapsed time T.

If Kp>0 and SP1<SP2 or Kp<0 and SP1<SP2, the first evaluation function computation unit 18 determines that overshoot has occurred in the controlled variable PV, at a time point at which PV−SP>0 holds. If Kp<0 and SP1>SP2 or Kp>0 and SP1>SP2, the first evaluation function computation unit 18 determines that overshoot has occurred, at a time point at which PV−SP<0 holds. The first evaluation function computation unit 18 then calculates the evaluation function value G from an overshoot amount OS_sim that has occurred and an ideal overshoot amount OS according to equation (12) (step 204). The overshoot amount OS_sim can be obtained by PV−SP.

The first simulation computation unit 17 and the first evaluation function computation unit 18 repeatedly execute the above first simulation processing and first evaluation function processing at elapsed time T>0 in predetermined cycles until T≧Tsim holds in step 205.

Subsequently, if it is determined in step 205 that T≧Tsim holds, the first simulation computation unit 17 determines that the first simulation processing is complete, and determines whether the processing in steps 201 to 205 is complete for all values which the manipulated variable maintenance time dTmv can take (step 206). If the processing in steps 201 to 205 is complete for all the values which the manipulated variable maintenance time dTmv can take, the flow advances to step 207. If the processing is not complete, the flow returns to step 201 to cause the manipulated variable maintenance time search computation unit 19 to create a new value of the manipulated variable maintenance time dTmv. In this manner, the processing in steps 201 to 205 is executed for all the values which the manipulated variable maintenance time dTmv can take.

When the processing in steps 201 to 205 is complete for all the values which the manipulated variable maintenance time dTmv can take, the manipulated variable maintenance time search computation unit 19 executes the first evaluation function value comparison processing to extract the manipulated variable maintenance time dTmv which provides a minimum evaluation function value G_min (step 207). The ideal response waveform registration processing unit 20 registers the first simulation result corresponding to the extracted manipulated variable maintenance time dTmv as an ideal control response characteristic in the ideal control result storage unit 26 (step 208).

In the first simulation, the controlled variable PV at elapsed time T (0<T≦Tsim) is computed, and the elapsed time T and the controlled variable PV are stored as simulation results in the simulation computation unit 17. Of the first simulation results stored in the simulation computation unit 17, therefore, a result corresponding to the extracted manipulated variable maintenance time dTmv may be registered in the ideal control result storage unit 26.

Figure 7A:
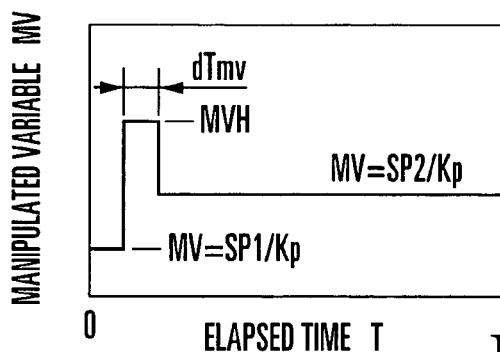
FIGS. 7A to 7F are timing charts for explaining ideal transition response trajectory determination processing in a manipulated variable maintenance time search computation unit in the second embodiment of the present invention.
Figure 7B:
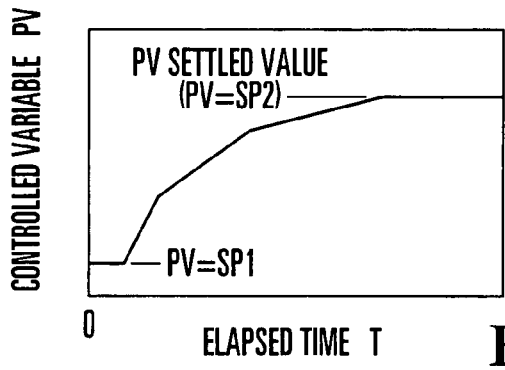

FIGS. 7A to 7F are views for explaining ideal transition response trajectory determination processing by the manipulated variable maintenance time search computation unit 19. FIG. 7B shows the result of the first simulation in which the manipulated variable MV with a waveform like that shown in FIG. 7A is applied to a controlled system. In the case shown in FIG. 7B, no overshoot occurs, and the controlled variable PV slowly approaches the set point SP2. That is, the requirement for the quick response characteristic of control is not satisfied. This response characteristic is therefore unsuitable as an ideal control response characteristic.

Figure 7C:
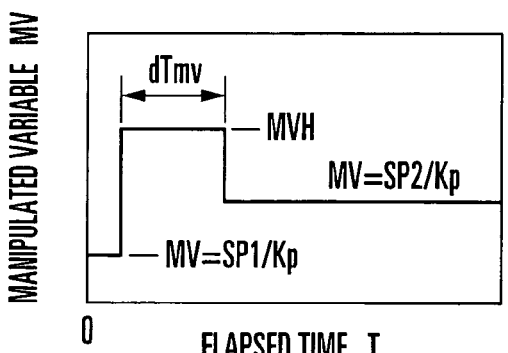
Figure 7D:
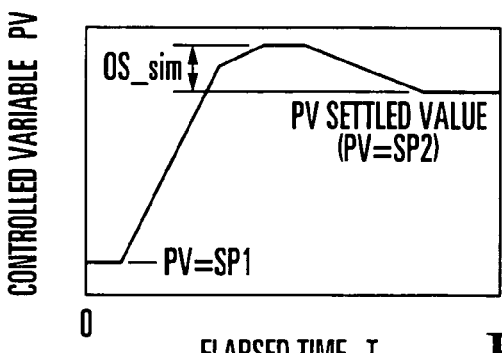

FIG. 7D shows the result of the first simulation in which the manipulated variable MV with a waveform like that shown in FIG. 7C is applied to the controlled system. In the case shown in FIG. 7D, large overshoot has occurred to result in excessive control response. That is, this response characteristic is unsuitable for an ideal control response characteristic.

Figure 7E:
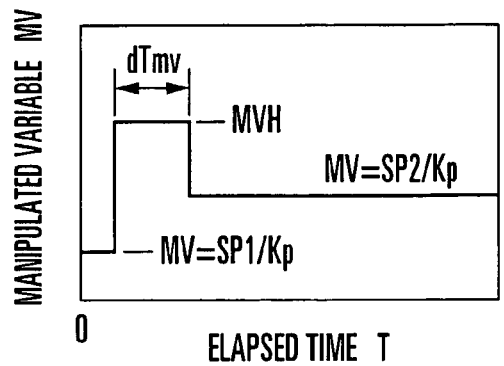
Figure 7F:
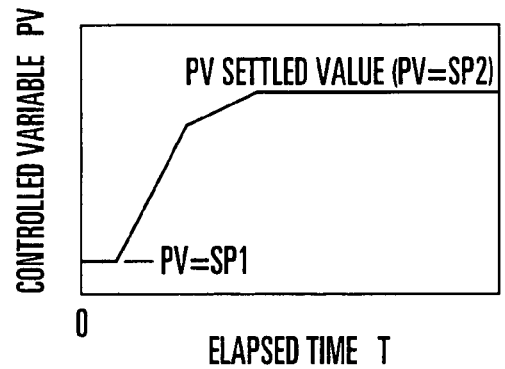

FIG. 7F shows the result of the first simulation in which the manipulated variable MV with a waveform like that shown in FIG. 7E is applied to the controlled system. In the case shown in FIG. 7F, overshoot which is so small as not to be shown in FIG. 7F has occurred, and the requirement for the quick response characteristic of control is satisfied while overshoot is moderately suppressed. That is, an ideal response waveform is obtained. As compared with the cases shown in FIGS. 7B and 7D, the evaluation function value G in the case shown in FIG. 7F is the smallest value near 0. Therefore, the trajectory of the controlled variable PV in FIG. 7F is registered as an ideal control response characteristic in the ideal control result storage unit 26.

As is also obvious from FIG. 7D, the overshoot amount OS_sim changes with the lapse of the time T during the first simulation. The value of the overshoot amount OS_sim is finally used when its absolute value is maximized. Although the first evaluation function value G calculated in step 204 also changes with the lapse of the time T, the value of the evaluation function value G is finally used when the absolute value of the overshoot amount OS_sim is maximized. In order to obtain the final value of the evaluation function value G, it suffices to use the calculated value in step 204 as the new evaluation function value G only when the calculated value exceeds the previously used value of the evaluation function value G and discard the calculated value when it is equal to or less than the previously used evaluation function value G.

The PID parameter search computation unit 28 then performs the PID parameter creation processing described in the first embodiment (step 209), and the second simulation computation unit 25 performs the second initialization processing (step 210). The second initialization processing is the same as the initialization processing described in the first embodiment.

Subsequently, the second simulation computation unit 25 performs the second simulation at elapsed time T=0 (step 211). The second simulation processing at elapsed time T=0 is the same as the simulation processing at elapsed time T=0 described in the first embodiment.

After the execution of the second simulation processing, the simulation computation unit 25 determines whether the elapsed time T has reached Tsim (step 213). If the elapsed time T has not reached Tsim, it is determined that the second simulation processing is not complete. The flow then returns to step 211 to perform the second simulation processing at elapsed time T>0. The second simulation processing at elapsed time T>0 is the same as the simulation processing at elapsed time T>0 described in the first embodiment. The second evaluation function computation unit 27 then executes the second evaluation function processing of calculating a second evaluation function value F (step 212). The second evaluation function processing is the same as the evaluation function processing described in the first embodiment.

If it is determined in step 213 that T≧Tsim holds, the second simulation computation unit 25 determines that the second simulation processing is complete, and determines whether the processing in steps 209 to 213 is complete for all the combinations of the PID parameters (step 214). If the processing in steps 209 to 213 is complete for all the combinations of the PID parameters, the flow advances to step 215. If the processing is not complete, the flow returns to step 209 to cause the PID parameter search computation unit 28 to create a new combination of the proportional band Pb, integral time Ti, and derivative time Td.

If the processing in steps 209 to 213 is complete for all the combinations of the PID parameters, the PID parameter search computation unit 28 executes the second evaluation function value comparison processing to extract a combination of the proportional band Pb, integral time Ti, and derivative time Td which provides a minimum evaluation function value F_min (step 215), and uses the extracted combination of the proportional band Pb, integral time Ti, and derivative time Td as a parameter adjustment result (step 216).

With the above operation, the processing by the PID parameter adjustment device is terminated.

According to this embodiment, the first simulation is performed to simulate the transition state of a controlled system by applying the manipulated variable upper limit value MVH or manipulated variable lower limit value MVL defined as a response condition variable to the controlled system for the manipulated variable maintenance time dTmv, and the difference between the first simulation result and the ideal response result is provided as the first evaluation function value G. An ideal control response characteristic is obtained by repeating the first simulation so as to make the first evaluation function value G approach an optimal value. This ideal control response characteristic is then registered in the ideal control result storage unit 26, thus searching for the PID parameters described in the first embodiment. This makes it possible to realize optimal PID parameter adjustment without requiring the user to have expertise about control.

Note that this embodiment is based on the assumption that OS does not become 0 or less, and a response time may be added to the first evaluation function. In evaluation with OS_sim=OS alone, even in the case shown in FIG. 7B in which the controlled variable PV slowly approaches the set point SP2, the first evaluation function value G may become an optimal value. As a consequence, many first simulation results which provide the optimal evaluation function value G appear, and hence ideal control response characteristics may not be narrowed down to one characteristic. Therefore, by adding evaluation based on whether the response time is minimum to the first evaluation function, a truly optimal result can be extracted from the first simulation results which provide the optimal evaluation function value G, thereby narrowing down ideal control response characteristics to one. This can prevent wrong optimization, i.e., using, as an ideal control response characteristic, a case wherein the controlled variable PV slowly approaches the set point SP2.

Third Embodiment

Figure 8:
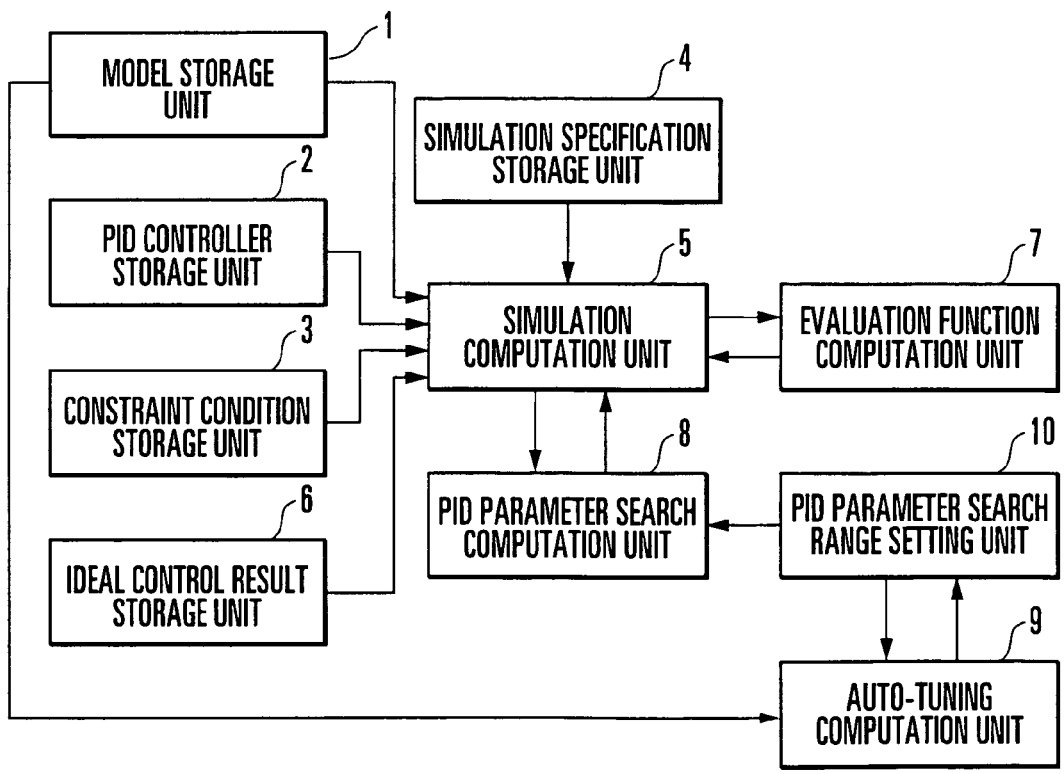
FIG. 8 is a block diagram showing the arrangement of a PID parameter adjustment device according to the third embodiment of the present invention.
Figure 9:
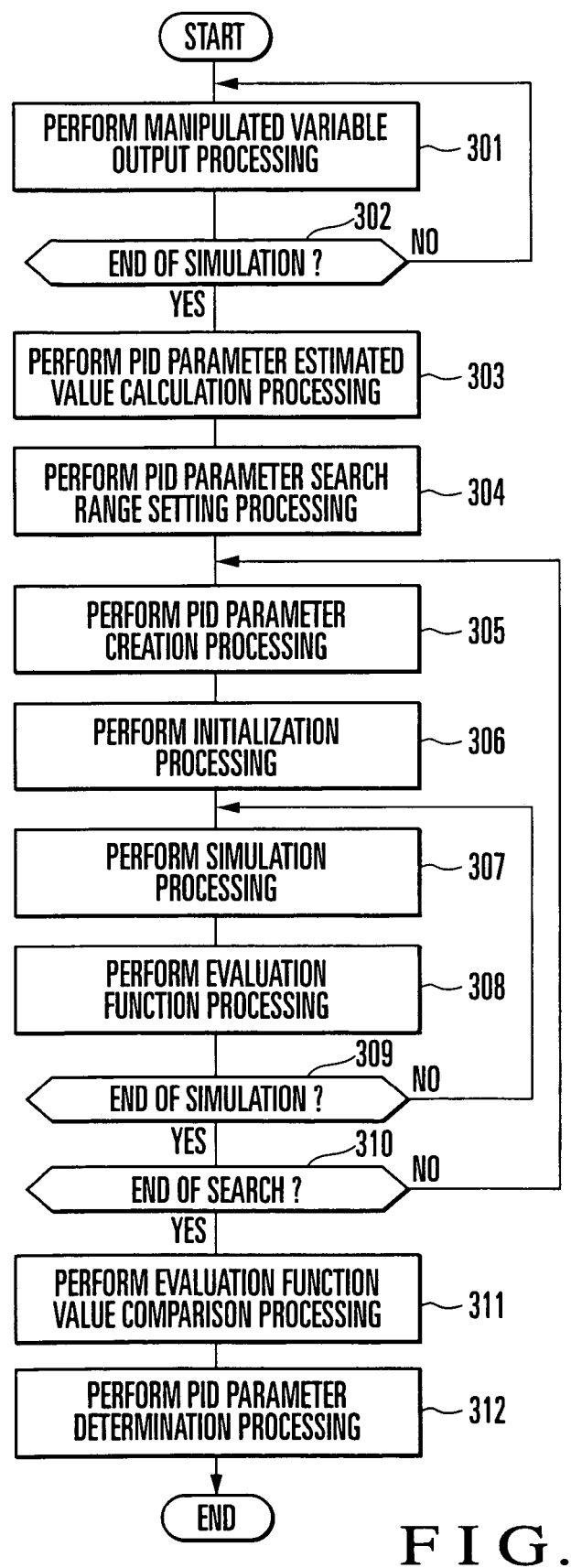
FIG. 9 is a flowchart showing the operation of the PID parameter adjustment device in FIG. 8.

The third embodiment of the present invention will be described next. FIG. 8 is a block diagram showing the arrangement of a PID parameter adjustment device according to the third embodiment of the present invention. FIG. 9 is a flowchart showing the operation of the PID parameter adjustment device in FIG. 8.

The PID parameter adjustment device of this embodiment is obtained by adding, to the PID parameter adjustment device of the first embodiment, an auto-tuning computation unit 9 which executes auto-tuning simulation processing of calculating an estimated value of a PID parameter from the response from a controlled system represented by a mathematical model in a model storage unit 1 by applying a manipulated variable with a predetermined amplitude to the controlled system, and a PID parameter search range setting unit 10 which determines a PID parameter search range on the basis of the estimated value of the PID parameter and sets the range in a PID parameter search computation unit 8.

The PID parameter adjustment device starts the processing in FIG. 9 in accordance with, for example, a request from the user. First of all, the auto-tuning computation unit 9 executes auto-tuning simulation processing comprising manipulated variable output processing, deviation extreme value detection processing, switching elapsed time detection processing, and PID parameter estimated value calculation processing.

In the manipulated variable output processing in step 301 in FIG. 9, the auto-tuning computation unit 9 executes the processing represented by expression (13) if Kp>0, and executes the processing represented by expression (14) if Kp<0:

$$\text{if } SP-PV>0 \text{ then } MV=MVH \text{ else } MV=MVL \tag{13}$$

$$\text{if } SP-PV>0 \text{ then } MV=MVL \text{ else } MV=MVH \tag{14}$$

Expression (13) indicates that if a set point SP is larger than a controlled variable PV, a manipulated variable MV is set to a manipulated variable upper limit value MVH, and if the set point SP is equal to or less than the controlled variable PV, the manipulated variable MV is set to a manipulated variable lower limit value MVL. Expression (14) indicates that if the set point SP is larger than the controlled variable PV, the manipulated variable MV is set to the manipulated variable lower limit value MVL, and if the set point SP is equal to or less than the controlled variable PV, the manipulated variable MV is set to the manipulated variable upper limit value MVH.

Figure 10:
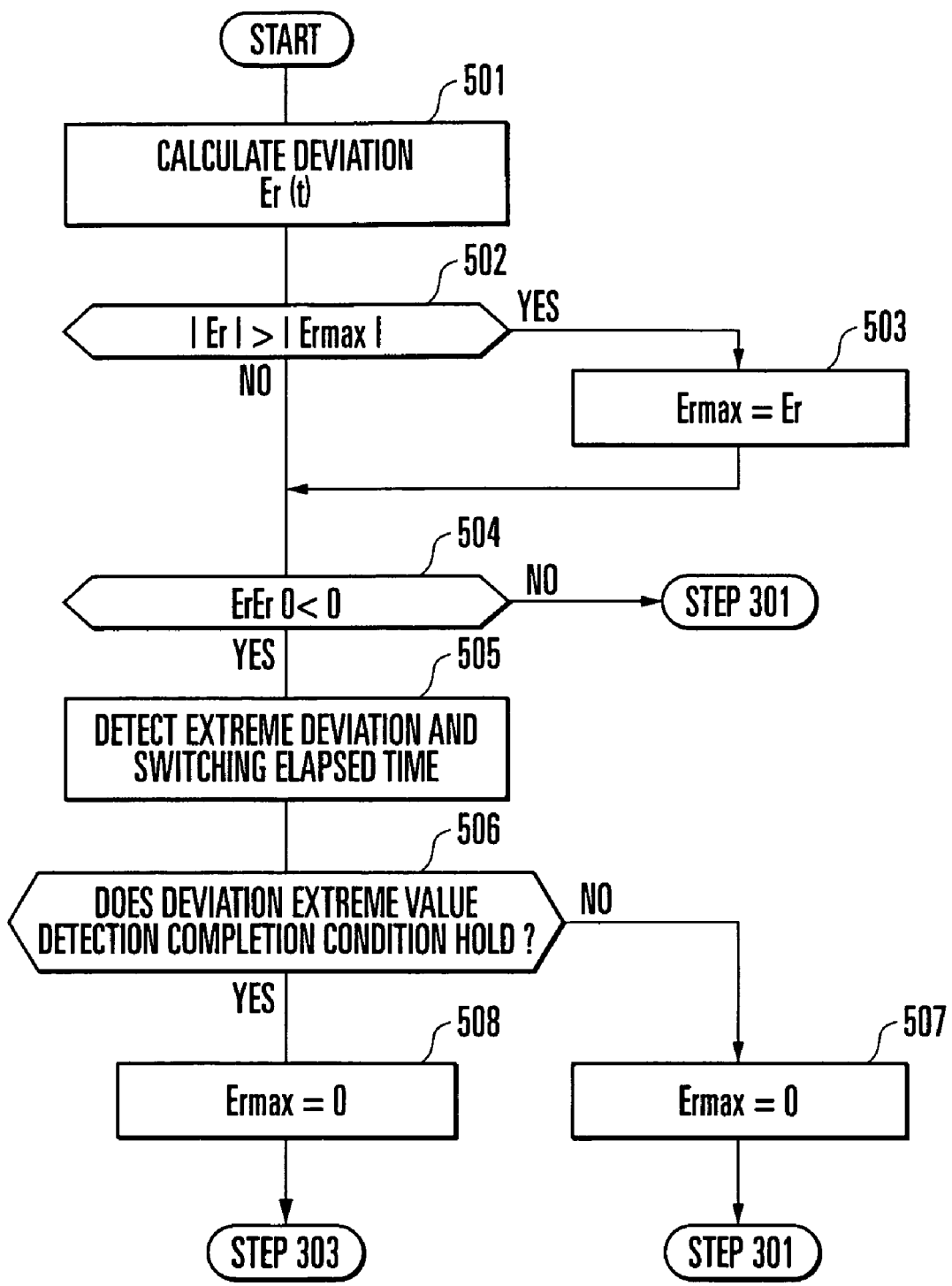
FIG. 10 is a flowchart showing the details of deviation extreme value detection processing and switching elapsed time detection processing in an auto-tuning computation unit in the third embodiment of the present invention.
Figure 11:
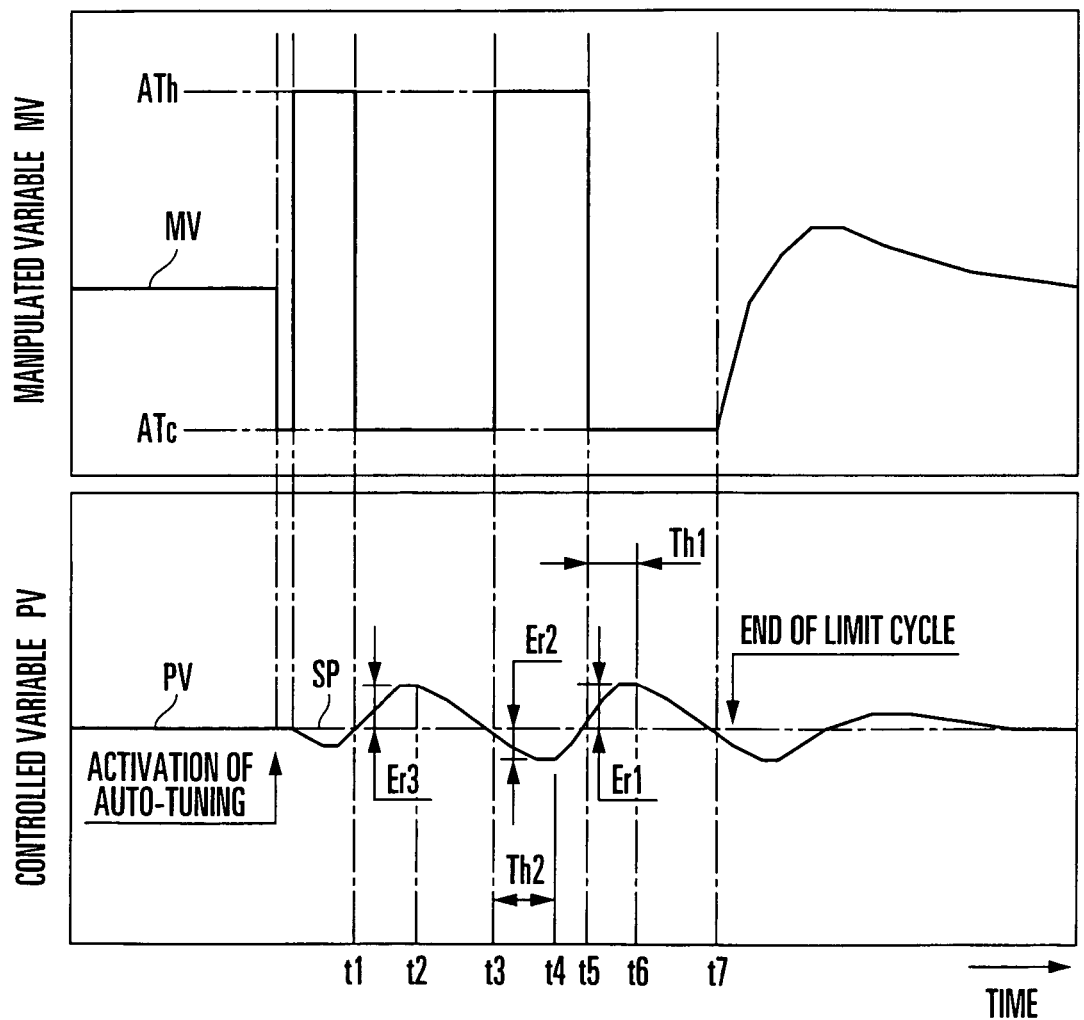
FIG. 11 shows timing charts for explaining deviation extreme value detection processing and switching elapsed time detection processing in the auto-tuning computation unit in the third embodiment of the present invention.

FIG. 10 is a flowchart showing the details of deviation extreme value detection processing and switching elapsed time detection processing (step 302) by the auto-tuning computation unit 9. FIG. 11 is a view for explaining the deviation extreme value detection processing and switching elapsed time detection processing.

First of all, the auto-tuning computation unit 9 computes the controlled variable PV according to equation (8). The auto-tuning computation unit 9 then sets SP−PV to a deviation Er (step 501 in FIG. 10), and determines whether the following equality holds (step 502):

$$|Er|>|Ermax| \tag{15}$$

where Ermax is the maximum value of a deviation. The initial value of the deviation is 0. The auto-tuning computation unit 9 sets Ermax=Ex, i.e., sets the current deviation Er to a maximum deviation Ermax, when inequality (15) holds (step 503).

The auto-tuning computation unit 9 determines according to the following inequality whether the polarity of the deviation Er has been switched (step 504):

$$ErEr0<0 \tag{16}$$

where Er0 is a deviation before one period. If inequality (16) does not hold, it is determined that the deviation extreme value detection is not complete, and the flow returns to step 301.

When the processing in steps 301 and 302 (steps 501 to 504) in FIG. 9 is repeated in every cycle, the maximum deviation Ermax is updated as the deviation Er increases. At time t1 in FIG. 11, inequality (16) holds.

When inequality (16) holds, the auto-tuning computation unit 9 sets Er1=Ermax, i.e., sets the maximum deviation Ermax to a first extreme deviation Er1. The auto-tuning computation unit 9 sets the time between the time when inequality (16) holds and the latest time when the maximum deviation Ermax is updated to a first manipulated variable switching elapsed time Th1 (step 505). Note that if inequality (16) holds for the first time, the first manipulated variable switching elapsed time Th1 is set to 0.

The auto-tuning computation unit 9 then determines whether the deviation extreme value detection completion condition holds (step 506). In this embodiment, the deviation extreme value detection completion condition is that four extreme values of the controlled variable PV are detected. In this case, since only one extreme value of the controlled variable PV is detected, it is determined that the deviation extreme value detection is not complete. The maximum deviation Ermax is initialized to 0 (step 507), and the flow returns to step 301.

The processing in steps 301 and 302 (steps 501 to 504) is repeated in every cycle, and inequality (16) holds again at time t3 in FIG. 11. When inequality (16) holds, the auto-tuning computation unit 9 sets Er2=Er1, Er1=Ermax, and Th2=Th1, i.e., substitutes the value of the first extreme deviation Er1 into the second extreme deviation Er2, sets the maximum deviation Ermax to the first extreme deviation Er1, and substitutes the value of the first manipulated variable switching elapsed time Th1 into the second manipulated variable switching elapsed time Th2. In addition, the auto-tuning computation unit 9 sets the time from time t1 when inequality (16) holds to latest time t2 when the maximum deviation Ermax is updated to the new first manipulated variable switching elapsed time Th1 (step 505).

The auto-tuning computation unit 9 determines whether the deviation extreme value detection completion condition holds (step 506). In this case, since only two extreme values of the controlled variable PV are detected, it is determined that the deviation extreme value detection is not complete, and the maximum deviation Ermax is initialized to 0 (step 507). The flow then returns to step 301.

The processing in steps 301 and 302 is repeated in every cycle, and inequality (16) holds again at time t5 in FIG. 11. When inequality (16) holds, the auto-tuning computation unit 9 sets Er3=Er2, Er2=Er1, Er1=Ermax, and Th2=Th1, i.e., substitutes the value of the second extreme deviation Er2 into the third extreme deviation Er3, substitutes the value of the first extreme deviation Er1 into the second extreme deviation Er2, sets the maximum deviation Ermax to the first extreme deviation Er1, and substitutes the value of the first manipulated variable switching elapsed time Th1 into the second manipulated variable switching elapsed time Th2. In addition, the auto-tuning computation unit 9 sets the time from time t3 when inequality (16) holds to latest time t4 when the maximum deviation Ermax is updated to the new first manipulated variable switching elapsed time Th1 (step 505).

The auto-tuning computation unit 9 determines whether the deviation extreme value detection completion condition holds (step 506). In this case, since only three extreme values of the controlled variable PV are detected, it is determined that the deviation extreme value detection is not complete, and the maximum deviation Ermax is initialized to 0 (step 507). The flow then returns to step 301.

The processing in steps 301 and 302 is repeated in every cycle, and inequality (16) holds again at time t7 in FIG. 11. When inequality (16) holds, the auto-tuning computation unit 9 sets Er3=Er2, Er2=Er1, Er1=Ermax, and Th2=Th1, and sets the time from time t5 when inequality (16) holds to latest time t6 when the maximum deviation Ermax is updated to the new first manipulated variable switching elapsed time Th1 (step 505).

The auto-tuning computation unit 9 determines whether the deviation extreme value detection completion condition holds (step 506). In this case, since four extreme values of the controlled variable PV are detected, it is determined that the deviation extreme value detection is complete, and the maximum deviation Ermax is initialized to 0 (step 507). The flow then advances to step 303.

When manipulated variable output processing, deviation extreme value detection processing, and switching elapsed time detection processing are repeatedly executed in predetermined cycles in the above manner, and the deviation extreme value detection completion condition holds, the auto-tuning simulation is terminated. As is also obvious from FIG. 11, although the number of extreme values of the controlled variable PV which are required for the calculation of PID parameters is essentially three, since the first extreme value may be inappropriate for the calculation of parameters, four extreme values of the controlled variable PV are detected.

After the termination of the auto-tuning simulation, the auto-tuning computation unit 9 calculates an estimated value of PID parameters, i.e., an estimated value Pbx of a proportional band, an estimated value Tix of an integral time, and an estimated value Tdx of a derivative time according to the following equations (step 303):

$$Pbx = 100|Er1-Er2|/(0.9|MVH-MVL|) \quad (17)$$

$$Tix = Th1 + Th2 \quad (18)$$

$$T = 0.21(Th1 + Th2) \quad (19)$$

The PID parameter search range setting unit 10 sets a search range for PID parameters for the PID parameter search computation unit 8 as follows on the basis of the calculated estimated value Pbx of the proportional band, the calculated estimated value Tix of the integral time, and the calculated estimated value Tdx of the derivative time (step 304):

$$0.5Pbx < Pb < 2Pbx \quad (20)$$

$$0.5Tix < Ti < 2Tix \quad (21)$$

$$0 < Td < 4Tdx \quad (22)$$

The settings for the PID parameter search computation unit 8 indicate that the range of 0<Pb<Pb_max which the above proportional band Pb can take is re-set to inequality (20), the range of 0<Ti<Ti_max which the integral time Ti can take is re-set to inequality (21), and the range of 0<Td<Td_max which the derivative time Td can take is re-set to inequality (22).

After the PID parameter search ranges are set, the model storage unit 1, a PID controller storage unit 2, a constraint condition storage unit 3, a simulation specification storage unit 4, a simulation computation unit 5, an evaluation function computation unit 7, and the PID parameter search computation unit 8 execute the processing described in the first embodiment. The processing in steps 305 to 312 in FIG. 9 is the same as that in steps 101 to 108 in FIG. 2.

In this embodiment, the limit cycle auto-tuning method of generating limit cycles with a predetermined manipulated variable width and adjusting PID parameters is executed by a simulation to estimate PID parameter adjustment results, and the processing in the first embodiment is executed upon narrowing down search ranges to around the estimated PID parameter values. This makes it possible to shorten the time required to search for optimal PID parameters in this embodiment as compared with the first embodiment.

In this embodiment, the auto-tuning computation unit 9 and the PID parameter search range setting unit 10 are added to the PID parameter adjustment device of the first embodiment. However, these units may be added to the PID parameter adjustment device of the second embodiment to set PID parameter search ranges for the PID parameter search computation unit 28.

In addition, each of the PID parameter adjustment devices described in the first to third embodiments can be implemented by a computer comprising an arithmetic unit, storage device, and interface and programs for controlling these hardware resources.

INDUSTRIAL APPLICABILITY

The present invention can be applied to parameter adjustment for a controller for PID control and the like.

The invention claimed is:

1. A parameter adjustment device which adjusts a control parameter for a controller which calculates a manipulated variable by performing computation based on the control parameter, characterized by comprising:
    a model storage unit which stores a mathematical model of a controlled system in advance;
    a controller storage unit which stores, in advance, a controller algorithm by which the controller controls the controlled system;
    a constraint condition storage unit which stores a constraint condition on operation of the controller in advance;
    a simulation computation unit which performs a simulation on the basis of the constraint condition to simulate a control response of a control system including the controlled system represented by the mathematical model and a controller represented by the controller algorithm;
    an ideal control result storage unit which stores an ideal control response characteristic of the control system in advance;
    an evaluation function computation unit which computes an evaluation function value representing a proximity between a result of the simulation and the ideal control response characteristic; and
    a parameter search computation unit which causes said simulation computation unit to execute the simulation while sequentially changing the control parameter for the controller algorithm, and uses, as a parameter adjustment result, a control parameter which makes the evaluation function value become an optimal value.

2. A parameter adjustment device according to claim 1, characterized by further comprising
    an auto-tuning computation unit which executes auto-tuning simulation processing of calculating an estimated value of the control parameter from a response of the controlled system by applying a manipulated variable with a predetermined amplitude to the controlled system, and
    a parameter search range setting unit which determines a search range of the control parameter on the basis of the estimated value of the control parameter and sets the search range in said parameter search computation unit.

3. A parameter adjustment device which adjusts a control parameter for a controller which calculates a manipulated variable by performing computation based on the control parameter, characterized by comprising:
    a model storage unit which stores a mathematical model of a controlled system in advance;
    a controller storage unit which stores, in advance, a controller algorithm by which the controller controls the controlled system;
    a constraint condition storage unit which stores a constraint condition on operation of the controller in advance;
    an ideal control result storage unit which stores an ideal control response characteristic associated with a control system including a controlled system represented by the mathematical model and a controller represented by the controller algorithm;
    a first simulation computation unit which performs a first simulation to simulate a transition state of the controlled system by applying an upper limit manipulated variable or a lower limit manipulated variable defined by the constraint condition to the controlled system for a manipulated variable maintenance time;
    an ideal response result storage unit which stores an ideal response result as an ideal result of the first simulation in advance;
    a first evaluation function computation unit which computes a first evaluation function value representing a proximity between a result of the first simulation and the ideal response result;
    a manipulated variable maintenance time search computation unit which extracts a manipulated variable maintenance time which makes the first evaluation function value become an optimal value by causing said first simulation computation unit to execute the first simulation while sequentially changing the manipulated variable maintenance time;
    an ideal response waveform registration processing unit which registers a result of the first simulation corresponding to the extracted manipulated variable maintenance time as the ideal control response characteristic in said ideal control result storage unit;
    a second simulation computation unit which performs a second simulation to simulate a control response of the control system on the basis of the constraint condition;
    a second evaluation function computation unit which computes a second evaluation function value representing a proximity between a result of the second simulation and the ideal control response characteristic registered in said ideal control result storage unit; and
    a parameter search computation unit which causes said second simulation computation unit to execute the second simulation while sequentially changing the control parameter for the controller algorithm, and uses, as a parameter adjustment result, a control parameter which makes the second evaluation function value become an optimal value.

4. A parameter adjustment device according to claim 2, characterized by further comprising
    an auto-tuning computation unit which executes auto-tuning simulation processing of calculating an estimated value of the control parameter from a response of the controlled system by applying a manipulated variable with a predetermined amplitude to the controlled system, and
    a parameter search range setting unit which determines a search range of the control parameter on the basis of the estimated value of the control parameter and sets the search range in said parameter search computation unit.

* * * * *

UNITED STATES PATENT AND TRADEMARK OFFICE
CERTIFICATE OF CORRECTION

| | |
|---|---|
| PATENT NO. | : 7,346,403 B2 |
| APPLICATION NO. | : 10/569035 |
| DATED | : March 18, 2008 |
| INVENTOR(S) | : Tanaka |

Page 1 of 1

It is certified that error appears in the above-identified patent and that said Letters Patent is hereby corrected as shown below:

Col. 20 in Claim 4, line 50, please delete "2" and insert -- 3 --.

Signed and Sealed this

Fifth Day of May, 2009

JOHN DOLL
*Acting Director of the United States Patent and Trademark Office*